(No Model.)
H. HEITMAN.
CATTLE STANCHION.
No. 509,031. Patented Nov. 21, 1893.
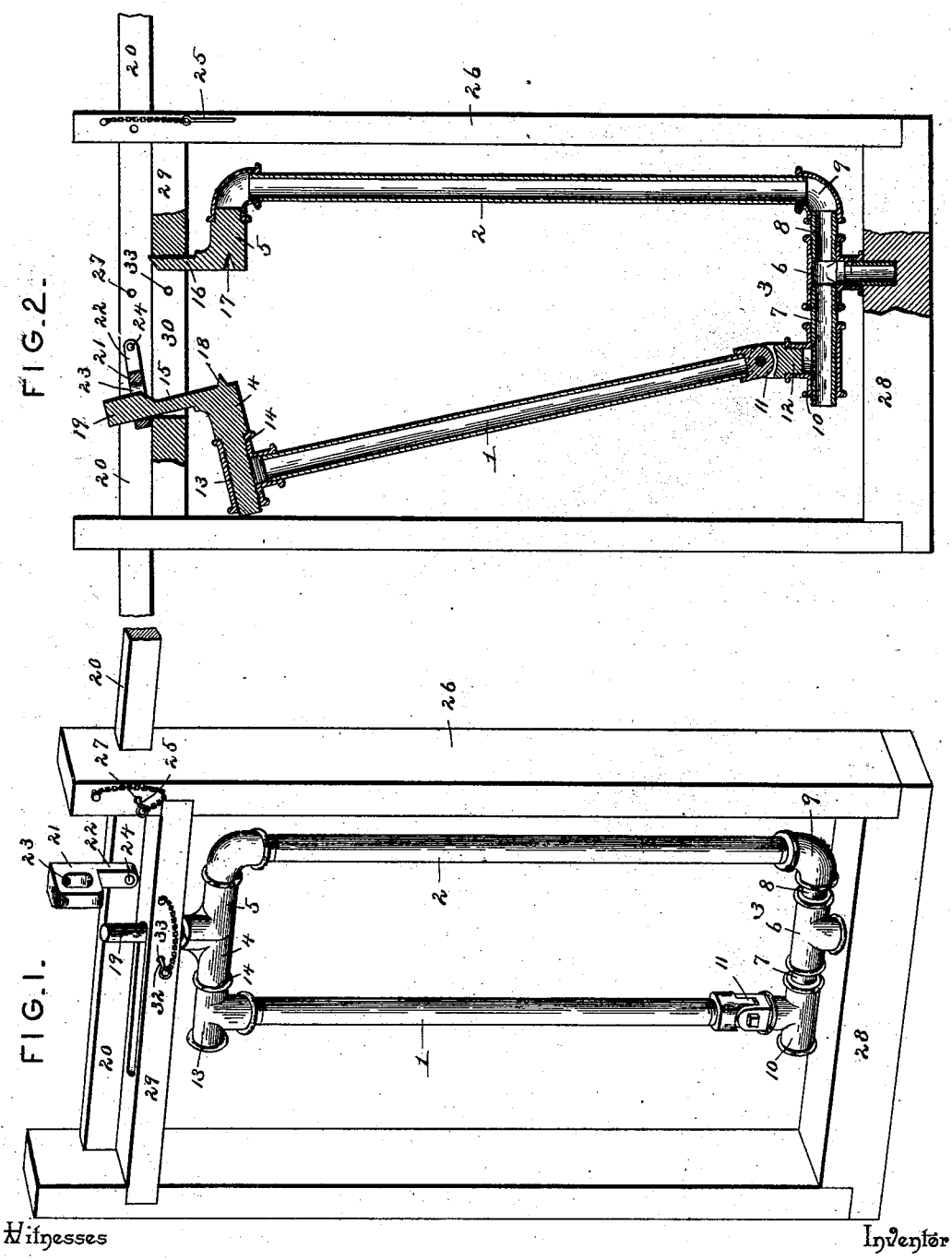
Witnesses
Harry L. Amer.
N. H. Riley
Inventor
Henry Heitman.
By his Attorneys,
C. A. Snow & Co.

UNITED STATES PATENT OFFICE.

HENRY HEITMAN, OF LOST NATION, IOWA.

CATTLE-STANCHION.

SPECIFICATION forming part of Letters Patent No. 509,031, dated November 21, 1893.

Application filed March 30, 1893. Serial No. 468,381. (No model.)

*To all whom it may concern:*

Be it known that I, HENRY HEITMAN, a citizen of the United States, residing at Lost Nation, in the county of Clinton and State of Iowa, have invented a new and useful Cattle-Stanchion, of which the following is a specification.

The invention relates to improvements in cattle stanchions.

The object of the present invention is to improve the construction of stanchions, and to provide one which may be readily adjusted in width to suit the animal to be confined in it, and which will enable a series of stanchions to be controlled readily either singly or collectively.

The invention consists in the construction and novel combination and arrangement of parts hereinafter fully described, illustrated in the accompanying drawings and pointed out in the claims hereto appended.

In the drawings—Figure 1 is a perspective view of a stanchion constructed in accordance with this invention. Fig. 2 is a vertical longitudinal sectional view.

Like numerals of reference indicate corresponding parts in both the figures of the drawings.

1 and 2 designate tubular sides of a stanchion, which has a pivoted bottom portion 3 and a top portion composed of sections 4 and 5, and having a sectional pivot. The stanchion is preferably constructed of tubular metal or pipes; and the bottom portion 3 consists of a T-shaped union 6 having laterally extending arms 7 and 8, formed by a tube arranged within the horizontal portion of the union 6 and extending beyond the ends of the same. The arm 8 is connected with the lower end of the side 2 by an elbow 9, and an adjustable union 10 is mounted on the arm 7 and is connected by a hinge 11 with the lower end of the side 1, whereby the latter is permitted to swing outward away from the side 2 to release an animal or to enable the head of an animal to be passed between the sides of the stanchion for confining it. The lower leaf of the hinge 11 is provided with a depending plug 12, which is screwed into the upwardly extending branch of the T-shaped union 10.

The upper end of the side 1 of the stanchion is provided with a union 13 similar in shape to the union 10 and interiorly threaded and adjustably connected with and engaging an exteriorly threaded arm or extension 14 of the section 4 of the top of the stanchion. By adjusting the unions or T-shaped pieces 10 and 13, the stanchion may be varied in width to suit different sizes of animals.

The sections 4 and 5 of the top of the stanchion are provided with pivot sections 15 and 16, which are adapted to fit together to form a cylindrical pivot for the top of the stanchion. The section 5 of the top is provided with a socket 17; and the section 4 has a projection 18, adapted to fit in the socket when the sections are together and the stanchion is closed to prevent the sections 4 and 5 from moving on each other.

The pivot section 15 is provided with a vertically disposed cylindrical extension 19, which is detachably connected with a sliding bar 20 by a pivoted keeper 21 consisting of a stem 22 and an eye or opening 23 to receive the extension 19. The pivot 24 of the keeper passes through the stem 22 which is arranged on one side of the sliding bar 20; and the keeper is adapted to swing upward and downward to release and engage the swinging side or portion of the stanchion. The sliding bar is adapted to be moved longitudinally to open and close the stanchion, and it will be seen that any number of stanchions may be connected with the sliding bar, which is locked against movement by a pin 25 of a frame 26 in which the stanchion is pivotally mounted. The locking pin 25 engages a perforation 27 of the sliding bar when the latter is locked.

The frame 26 is rectangular and has an opening in its bottom cross-piece 28 to receive a depending pivot of the bottom portion of the stanchion; and the top cross-piece 29 of the frame has a longitudinal opening 30 forming a bearing at one end to receive the upper pivot of the stanchion when the sections 4 and 5 are together and the stanchion is closed. The opening 30 permits the hinged portion of the stanchion to be moved away from the other portion by allowing the pivot section 15 a limited movement.

When it is desired to control the stanchions of a set separately, the stanchions are locked by means of a pin 32 arranged in a perforation 33 of the top cross-piece 29 of the frame 26 to prevent the pivot section 15 moving in the opening 30. The pivoted loop is then raised to release the extension of the pivot section 15. Any stanchion may be opened singly by withdrawing the pin 32 to allow the hinged portion of the stanchion to open.

It will be seen that the stanchion is simple and comparatively inexpensive in construction, that it is adapted to be adjusted in width to suit different sizes of animals, and that by its particular construction a series of stanchions may be readily controlled and operated both collectively or singly.

Changes in the form, proportion and the minor details of construction may be resorted to without departing from the principle or sacrificing any of the advantages of this invention.

When it is desired to adjust the stanchion as to width the pintle bolt of the hinge is removed and the lower end of the side 1 is disconnected from the lower T-shaped union. The lower T-shaped union may then be turned as desired on the bottom portion of the stanchion. The side 1 after being disconnected by the removal of the pintle bolt, is detached from the upper portion of the frame 26 for the adjustment of the upper T-shaped union. When the adjustment has been accomplished the parts are again assembled.

The pivoted keeper when not in engagement with the pivot extension of the section 4 of the top of the stanchion, is arranged vertically and may move freely past the top of the stanchion when in disposition without liability of striking the pivot.

What I claim is—

1. The combination of a stanchion pivotally mounted and having one side hinged and provided at the top of the hinged side with an extension, a sliding bar arranged horizontally at the top of the stanchion, and a keeper pivoted to the sliding bar and having an opening receiving the extension of the hinged side of the standard, and capable of upward swinging to release the hinged side of the standard, substantially as described.

2. In a stanchion, the combination of the top sections 4 and 5 having pivot sections and provided respectively on their engaging faces with a projection and a socket, the bottom portion having a depending pivot, the side 2 provided at its ends with elbows, the upper one being secured to the section 5 and the lower one to one end of the bottom portion, a lower T-shaped union 10 interiorly threaded and screwing on the other end of the bottom portion, an upper T-shaped union interiorly threaded and screwing on the section 4, the side 1 secured to the upper T-shaped union, a hinge connecting the lower end of the side 1 with the lower T-shaped union, and means for securing the top sections 4 and 5 together, substantially as described.

3. In a stanchion, the combination of a frame, provided at its top with an opening, the top sections 4 and 5 provided with pivot sections extending upward and having adjacent faces fitted together and forming a cylindrical pivot, the sections being provided with a threaded horizontal arm, the side 2 having its upper end secured to the section 5, the side 1 having at its bottom a hinged joint and provided at its upper and lower ends with interiorly threaded T-shaped unions, the upper one receiving the horizontal arm of the top section 4 and being adjustable, and the bottom portion 3 composed of a depending pivot journaled on the frame and opposite arms, one of the arms being secured to the lower end of the side 2 and the other arm being threaded and being received by the lower union of the side 1, substantially as described.

In testimony that I claim the foregoing as my own I have hereto affixed my signature in the presence of two witnesses.

HENRY HEITMAN.

Witnesses:
R. M. GABLE,
J. D. JENKINS.